May 21, 1963 E. H. WARNE 3,090,199
MACHINES INCORPORATING A PLURALITY OF ENGINES
Filed Sept. 11, 1961
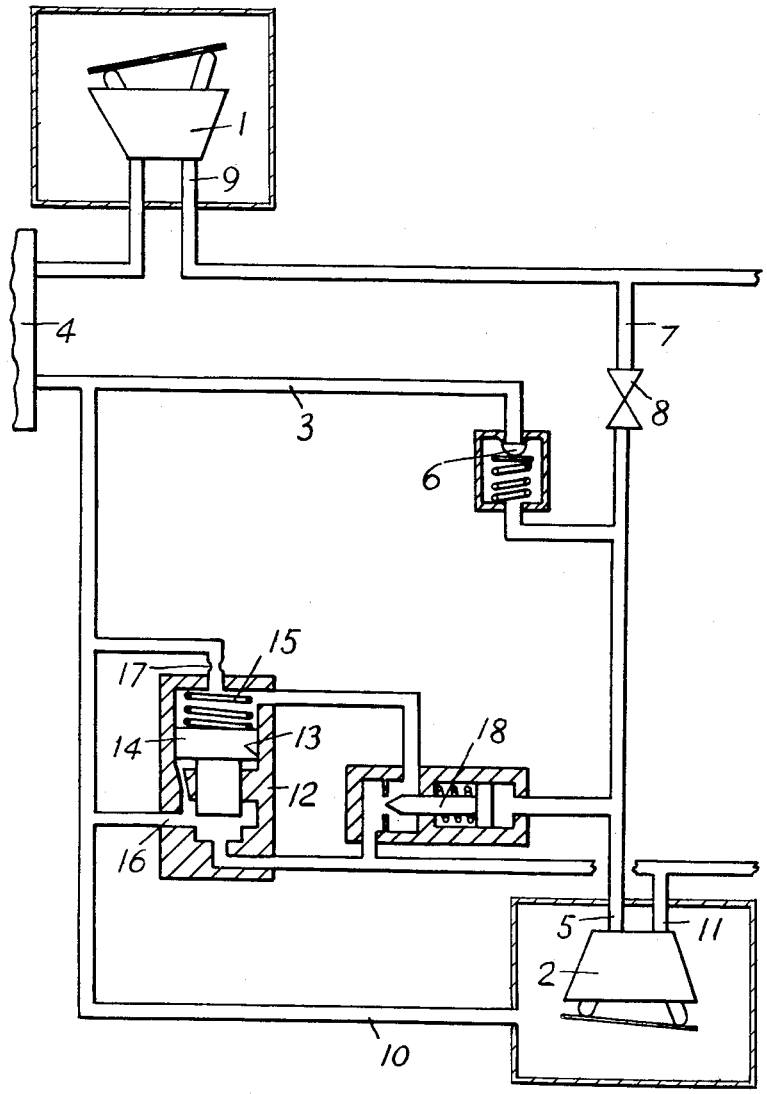

United States Patent Office 3,090,199
Patented May 21, 1963

3,090,199
MACHINES INCORPORATING A PLURALITY
OF ENGINES
Eugene Harold Warne, Solihull, England, assignor to
Joseph Lucas (Industries) Limited, Birmingham, England
Filed Sept. 11, 1961, Ser. No. 137,269
Claims priority, application Great Britain Sept. 22, 1960
3 Claims. (Cl. 60—39.14)

This invention relates to machines of the kind incorporating at least one main engine and at least one subsidiary engine, each engine being mechanically connected to its own fuel pump of the swash plate type.

One application of the invention is to aircraft incorporating at least one main engine for producing a forward thrust when the engine is airborne, and at least one subsidiary engine for producing a vertical thrust. With such aircraft it is usual to stop the subsidiary engine or engines when the aircraft has attained a required height and forward velocity. However, when it is required to descend or gain height rapidly it is required to restart the subsidiary engine or engines. For this purpose it has been usual to incorporate a starter for the or each subsidiary engine thereby adding to the weight and cost of the aircraft. By the present invention the need for a separate starter or starters is obviated.

Acording to the invention in a machine of the kind specified means is provided whereby excess fuel from the fuel pump driven by the main engine can be directed to the fuel pump of the subsidiary engine to cause the latter fuel pump to act as a hydraulic motor until the subsidiary engine has started.

The accompanying drawing is a diagram illustrating an example of the invention as applied to an aircraft incorporating one vertical gas turbine engine and one horizontal gas turbine engine.

Referring to the drawing, there are provided a pair of fuel pumps 1 and 2, both of the swash-plate type, mechanically connected respectively to the horizontal and vertical engines. In the supply pipe 3 from the fuel tank 4 to the inlet 5 of the pump 2 is a non-return valve 6 for preventing flow back to the tank. At a point between the non-return valve and the inlet 5 is a branch pipe 7 which can be connected through a manually or otherwise operable valve 8 to the outlet pipe 9 of the fuel pump 1. When the horizontal engine is in operation and the vertical engine is at rest opening of the valve 8 will cause the excess fuel delivered by the pump 1 to be delivered to the inlet 5 of the pump 2.

Since the fuel cannot flow back to the tank through the valve 6 the fuel pump 2 is caused to act as a hydraulic motor until the vertical engine has started.

It is usual for the rotors of swash plate type pumps to operate in a flooded condition, and to provide for this requirement on the pump 2 the upstream side of the valve 6 is connected through a second branch pipe 10 with the housing of the pump 2. Moreover, the outlet pipe 11 of the pump 2 is interconnected with the branch pipe 10 through a relief valve 12.

The valve 12 includes a stepped cylinder 13 the narrower end of which is in communication with the outlet 11 of the pump 2. In the cylinder 13 is a stepped piston 14 which is loaded by a spring 15 towards the narrower end of the cylinder into a position in which it covers a port 16 leading to the branch pipe 10. The wider end of the cylinder is also in communication with the branch pipe 10 through a restricted orifice 17. Moreover, the wider end of the cylinder is connected to the outlet pipe 11 of the pump 2 through a valve 18 which is arranged to be closed by the pressure of excess fuel from the pump 1 when the valve 8 is opened.

When it is required to start the vertical engine a limited quantity of fuel from the pump 1 is diverted to the inlet 5 of the pump 2 and drives it as a motor to rotate the vertical engine. This fuel passes from the outlet 11 and is divided into two streams, one of which goes to the vertical engine fuel system and supplies that engine during the starting period. The other stream passes via the relief valve 12 back to the lower pressure part of the fuel system. The relief valve ensures that the fuel from the pump 2 is delivered to the vertical engine at not more than a predetermined maximum pressure.

When the vertical engine has accelerated to a sufficiently high speed, the demand of the pump 2 will be greater than the limited quantity diverted from the pump 1. Consequently, the pressure at the inlet 5 of the pump 2 will fall until it is slightly less than the pressure in the low pressure fuel system. When this occurs, fuel is admitted from the latter system through the non-return valve 6 to the pump inlet. At the same time the pressure controlled valve 18 will open admitting pump delivery pressure to the wider end of the stepped cylinder 13 causing the piston 14 to move and close the connection between the pump outlet 11 and the branch pipe 10 thus leaving the vertical engine under the control of its normal fuel system. The valve 8 may then be closed.

It will be understood that the invention can be applied in a similar manner to aircraft incorporating more than one vertical and/or horizontal engine, the pump associated with the or each horizontal engine being arranged to supply excess fuel to the pump or pumps of one or more of the vertical engines.

Having thus described my invention what I claim as new and desire to secure by Letters Patent is:

1. For use in a machine having at least one main engine, a fuel tank, a first swash-plate pump which has an inlet pipe and a delivery pipe respectively connected to the fuel tank and the main engine, and which is mechanically connected to, and operable by, the main engine for supplying fuel thereto, at least one subsidiary engine, and a second swash-plate pump which has an inlet pipe and a delivery pipe respectively connected to the fuel tank and the subsidiary engine, and which is mechanically connected to, and operable by, the subsidiary engine for supplying fuel thereto, means comprising in combination with the first and second swash-plate pumps and the fuel tank, a non-return valve in the inlet pipe of the second swash-plate pump, a branch passage which connects the delivery pipe of the first swash-plate pump to the inlet pipe of the second swash-plate pump at a position between the latter and said non-return valve, and through which fuel from the last mentioned delivery pipe is admissible to the inlet pipe of the second swash-plate pump for causing the latter to act as a hydraulic motor for starting the subsidiary engine, a valve which forms a part of said branch passage, and which is operable for controlling fuel flow therethrough, a second branch passage connecting the delivery pipe of the second swash-plate pump to the inlet pipe thereof at a position between said fuel tank and said non-return valve, a pressure-responsive relief valve in said second branch passage for controlling the pressure in the delivery pipe of the second swash-plate pump when the latter is acting as a hydraulic motor, and a pressure responsive valve means responsive to the difference in pressure in the inlet pipe of the second swash-plate pump and in the second branch passage to control the relief valve to prevent flow through said second branch passage when the subsidiary engine is turning at a sufficiently high speed for self operation.

2. Means according to claim 1, wherein said relief valve comprises a stepped cylinder the narrower end of which forms a part of said second branch passage, and the wider end of which is connected through a restricted orifice with another part of said second branch passage, a stepped piston slidably mounted in said stepped cylinder, and a compression spring contained in said stepped cylinder, and acting on the wider end of said stepped piston for urging the narrower end thereof towards the narrower end of said stepped cylinder, the wider end of said stepped cylinder being in communication with said additional valve which is arranged to be opened for equalising the fluid pressures in the ends of said stepped cylinder when the second swash-plate pump functions as a fuel pump, and thereby enabling said stepped piston to be moved by said compression spring to a position for closing the adjacent part of said second branch passage.

3. Means according to claim 2, wherein said additional valve is provided with a loading spring for causing said additional valve to open when the pressure in the inlet pipe of the second swash-plate pump is low.

References Cited in the file of this patent

UNITED STATES PATENTS

| 2,382,437 | Molly | Aug. 14, 1945 |
| 2,840,987 | Bloomberg | July 1, 1958 |

FOREIGN PATENTS

| 690,120 | Great Britain | Apr. 15, 1953 |